US008331066B2

(12) United States Patent
Brusky

(10) Patent No.: US 8,331,066 B2

(45) Date of Patent: Dec. 11, 2012

(54) LOW FORCE LOW OIL TRIP MECHANISM

(75) Inventor: Nicholas Paul Brusky, Milwaukee, WI (US)

(73) Assignee: Cooper Technologies Company, Houston, TX (US)

(*) Notice: Subject to any disclaimer, the term of this patent is extended or adjusted under 35 U.S.C. 154(b) by 455 days.

(21) Appl. No.: 12/629,917

(22) Filed: Dec. 3, 2009

(65) Prior Publication Data

US 2010/0142102 A1 Jun. 10, 2010

Related U.S. Application Data

(60) Provisional application No. 61/119,914, filed on Dec. 4, 2008.

(51) Int. Cl.
*H02H 7/04* (2006.01)

(52) U.S. Cl. .......................................................... 361/35

(58) Field of Classification Search ..................... 361/35
See application file for complete search history.

(56) References Cited

U.S. PATENT DOCUMENTS 1,943,011 A 1/1934 Fryar
RE21,527 E 8/1940 Smulski
2,411,351 A 11/1946 Armstrong
2,466,072 A 4/1949 Batcheller
2,523,370 A 9/1950 Jeffrey
2,540,294 A 2/1951 Schleicher
2,591,017 A 4/1952 Schultz
2,858,384 A 10/1958 Taylor et al.
2,990,878 A 7/1961 Larsen
3,246,100 A 4/1966 Russell
3,272,945 A 9/1966 Flook, Jr. et al.
3,289,131 A 11/1966 Watkins et al.
3,316,367 A 4/1967 Kowalski
3,430,170 A 2/1969 Shantas et al.

(Continued)

FOREIGN PATENT DOCUMENTS

CN 1698150 A 11/2005

(Continued)

OTHER PUBLICATIONS

Cooper Power Systems, OEM Equipment, Four-Position Sectionalizing Loadbreak Switches, Electrical Apparatus 800-64, Dec. 2003 (8 pages).

(Continued)

*Primary Examiner* — Jared Fureman
*Assistant Examiner* — Scott Bauer
(74) *Attorney, Agent, or Firm* — King & Spalding LLP

(57) ABSTRACT

A circuit breaker for a transformer includes means for interrupting circuitry in the transformer upon a fault condition in the transformer (the "fault interruption means"). The circuit breaker also includes means for interrupting the circuitry when a level of dielectric fluid in a tank of the transformer is unacceptably low (the "low oil trip means"). The fault interruption means includes a magnet, metal element, and first actuator. Upon the fault condition, the magnet and metal element separate, moving the first actuator to cause the electrical circuitry to open. The low oil trip means includes a float, insulating rod, and second actuator. When the dielectric fluid level drops to an unacceptably low level, the float and insulating rod drop, moving the second actuator to cause the circuitry to open. The low oil trip means operates independently of the fault interruption means, opening the circuitry without separating the magnet and metal element.

18 Claims, 10 Drawing Sheets

U.S. PATENT DOCUMENTS

| | | | |
|---|---|---|---|
| 3,451,055 A | 6/1969 | Pihl | |
| 3,582,856 A | 6/1971 | Watrous et al. | |
| 3,590,183 A | 6/1971 | Leonard | |
| 3,634,857 A | 1/1972 | Pihl | |
| 3,715,543 A | 2/1973 | Keto et al. | |
| 3,789,172 A | 1/1974 | Cole et al. | |
| 3,944,772 A | 3/1976 | Davies | |
| 4,032,870 A | 6/1977 | Oppel et al. | |
| 4,080,582 A | 3/1978 | Link | |
| 4,132,986 A | 1/1979 | Hart et al. | |
| 4,226,211 A | 10/1980 | Barrentine | |
| 4,234,847 A | 11/1980 | Schweitzer | |
| 4,245,140 A | 1/1981 | Jencks et al. | |
| 4,262,216 A | 4/1981 | Johnston | |
| 4,268,890 A | 5/1981 | Silbermann | |
| 4,288,769 A | 9/1981 | Howell | |
| 4,383,231 A | 5/1983 | Yamanaka et al. | |
| 4,412,116 A | 10/1983 | Golub | |
| 4,424,512 A | 1/1984 | Schweitzer, Jr. | |
| 4,427,860 A | 1/1984 | Eley | |
| 4,435,690 A | 3/1984 | Link et al. | |
| 4,438,403 A | 3/1984 | Schweitzer, Jr. | |
| 4,550,298 A | 10/1985 | Mikulecky | |
| 4,554,420 A | 11/1985 | Golub | |
| 4,591,816 A | 5/1986 | Mikulecky et al. | |
| 4,611,189 A | 9/1986 | Mikulecky | |
| 4,737,878 A | 4/1988 | Mikulecky | |
| 4,795,982 A | 1/1989 | Schweitzer, Jr. | |
| 4,873,706 A | 10/1989 | Schweitzer, Jr. | |
| 5,021,615 A | 6/1991 | Muench et al. | |
| 5,070,252 A | 12/1991 | Castenschiold et al. | |
| 5,220,311 A | 6/1993 | Schweitzer, Jr. | |
| 5,252,933 A | 10/1993 | Kamino et al. | |
| 5,278,530 A | 1/1994 | Zovath | |
| 5,351,024 A | 9/1994 | Juds et al. | |
| 5,552,647 A | 9/1996 | Tinkham | |
| 5,726,621 A | 3/1998 | Whitney et al. | |
| 5,925,405 A | 7/1999 | Ali-Khan | |
| 6,037,555 A | 3/2000 | Castonguay et al. | |
| 6,069,331 A | 5/2000 | Utke | |
| 6,133,723 A | 10/2000 | Feight | |
| 6,218,920 B1 | 4/2001 | Reichard et al. | |
| 6,281,458 B1 | 8/2001 | Castonguay et al. | |
| 6,403,909 B1 | 6/2002 | Green et al. | |
| 6,559,743 B2 | 5/2003 | Narayanan et al. | |
| 6,566,618 B2 | 5/2003 | Hamada et al. | |
| 6,590,173 B2 | 7/2003 | Uchida et al. | |
| 6,703,575 B1 | 3/2004 | Yamamoto | |
| 6,768,412 B2 | 7/2004 | Becka et al. | |
| 6,781,504 B2 | 8/2004 | Scott et al. | |
| 6,791,440 B2 | 9/2004 | Harmon et al. | |
| 6,794,595 B2 | 9/2004 | Charles et al. | |
| 6,797,909 B2 | 9/2004 | Pride et al. | |
| 6,825,426 B2 | 11/2004 | Muench et al. | |
| 6,839,207 B2 | 1/2005 | Folliot et al. | |
| 6,930,271 B1 | 8/2005 | Palmieri et al. | |
| 7,002,440 B2 | 2/2006 | Attarian et al. | |
| 7,019,606 B2 | 3/2006 | Williams et al. | |
| 7,199,686 B1 * | 4/2007 | Tsai | 335/6 |
| 7,330,097 B2 | 2/2008 | Takeda | |
| 7,623,010 B2 | 11/2009 | Liu | |
| 7,683,287 B2 | 3/2010 | Lindsey et al. | |
| 2003/0032892 A1 | 2/2003 | Erlach et al. | |
| 2003/0187550 A1 | 10/2003 | Wilson et al. | |
| 2004/0094394 A1 | 5/2004 | Muench et al. | |
| 2004/0100741 A1 | 5/2004 | Bosga et al. | |
| 2004/0150504 A1 | 8/2004 | Nicholson | |
| 2004/0169014 A1 | 9/2004 | Pride et al. | |
| 2005/0003199 A1 | 1/2005 | Takaya et al. | |
| 2005/0212629 A1 | 9/2005 | Williams et al. | |
| 2006/0152308 A1 | 7/2006 | Rajauria et al. | |
| 2007/0138143 A1 | 6/2007 | Muench et al. | |
| 2007/0161270 A1 | 7/2007 | Insalaco et al. | |
| 2007/0222467 A1 | 9/2007 | Nickson | |
| 2009/0277768 A1 | 11/2009 | Brusky et al. | |
| 2009/0278635 A1 | 11/2009 | Lindsey et al. | |
| 2009/0278636 A1 | 11/2009 | Brusky et al. | |
| 2009/0279216 A1 | 11/2009 | Brusky et al. | |
| 2009/0279223 A1 | 11/2009 | Brusky et al. | |
| 2010/0013583 A1 | 1/2010 | Kimura | |
| 2010/0038220 A1 | 2/2010 | Lindsey et al. | |
| 2010/0038221 A1 | 2/2010 | Lindsey et al. | |
| 2010/0038222 A1 | 2/2010 | Lindsey | |

FOREIGN PATENT DOCUMENTS

| | | | |
|---|---|---|---|
| EP | 0034966 | A1 | 7/1984 |
| EP | 0727858 | A3 | 8/1996 |
| GB | 382656 | | 10/1932 |
| TW | 278039 | | 10/2005 |
| WO | WO9919891 | A1 | 4/1999 |
| WO | WO9960591 | A1 | 11/1999 |
| WO | WO0175919 | A1 | 10/2001 |

OTHER PUBLICATIONS

Cooper Power Systems, Fusing Equipment, MagneX™ Single-Phase Interrupter, Electrical Apparatus 240-34, Mar. 2006 (7 pages).

Shanghai Huaming Power Equipment Company brochure (4 pages).

Jaker Electric Co., Ltd., Taiwan, ROC; "Pole Mount Transformer Integrated Service" brochure, pp. 1-8; copy attached; also see brochure at http://www.jaker.com.tw/np_pole01.htm; Sep. 23, 2006.

* cited by examiner

100

LOW FORCE LOW OIL TRIP MECHANISM

RELATED PATENT APPLICATIONS

This non-provisional patent application claims priority under 35 U.S.C. §119 to U.S. Provisional Patent Application No. 61/119,914, entitled "Low Force Trip Mechanism for Primary Circuit Breaker," filed Dec. 4, 2008. This application is related to U.S. Pat. No. 4,435,690, entitled "Primary Circuit Breaker," filed Apr. 26, 1982, U.S. Pat. No. 4,611,189, entitled "Underoil Primary Circuit Breaker," filed Feb. 7, 1985, and U.S. Pat. No. 4,550,298, entitled "Trip Assembly for a Circuit Breaker," filed Jan. 23, 1984. The complete disclosure of each of the foregoing priority and related patent applications is hereby fully incorporated herein by reference.

TECHNICAL FIELD

The invention relates generally to a circuit breaker, and more particularly, to a low force low oil trip mechanism for a circuit breaker.

BACKGROUND

A transformer is a device that transfers electrical energy from a primary circuit to a secondary circuit by magnetic coupling. Typically, a transformer includes a primary winding coupled to the primary circuit and at least one secondary winding coupled to the secondary circuit. The windings are wrapped around a core of the transformer. An alternating voltage applied to the primary winding creates a time-varying magnetic flux in the core, which induces a voltage in the secondary windings. Varying the relative number of turns of the primary and secondary windings around the core determines the ratio of the input and output voltages of the transformer. For example, a transformer with a turn ratio of 2:1 (primary:secondary) has an input voltage (from the primary circuit) that is two times greater than its output voltage (to the secondary circuit).

Over-current protection devices are widely used to prevent damage to the primary and secondary circuits of transformers. For example, distribution transformers have conventionally been protected from fault currents by circuit breakers. Circuit breakers interrupt continuity in the electrical circuitry of the transformer upon detecting a fault therein. Unlike a fuse, which operates once and then has to be replaced, a circuit breaker can be reset and reused multiple times.

It is well known in the art to cool high-power transformers and over-current protection devices thereof using a dielectric fluid, such as a highly-refined mineral oil. The dielectric fluid is stable at high temperatures and has excellent insulating properties for suppressing corona discharge and electric arcing in the transformer. For example, the dielectric fluid can suppress corona discharge and electric arcing that occurs when a circuit breaker interrupts the electrical circuitry of the transformer. Typically, the transformer includes a tank that is at least partially filled with the dielectric fluid. The dielectric fluid surrounds the transformer core and windings and at least part of the circuit breaker.

The dielectric fluid in the tank may recede for any of a variety of reasons. For example, the dielectric fluid may recede because of a leak in the transformer tank. It can be problematic and even dangerous if the dielectric fluid in the tank recedes below a particular level. For example, if the dielectric fluid recedes below one or more components of the circuit breaker, the dielectric fluid may not provide sufficient insulative protection during a fault condition. In addition, if the dielectric fluid has dropped below the level of an arc chamber in the circuit breaker, an arc produced on interruption will be in air medium and may not extinguish until major damage has been done to the transformer.

Therefore, it is desired to provide a circuit breaker that includes functionality for interrupting the electrical circuitry of the transformer when the dielectric fluid level of the transformer tank recedes to an unacceptable level.

SUMMARY

A circuit breaker for a transformer is described herein. The circuit breaker includes a stationary contact configured to be electrically coupled to a circuit of a transformer. A movable contact is movable relative to the stationary contact and can open and close the circuit. A trip mechanism coupled to the movable contact is actuated when a fault condition exists in the transformer or when a level of dielectric fluid in a tank of the transformer is unacceptably low.

A curie metal element is electrically coupled to the circuit. A magnet is coupled to the curie metal element when the circuit is closed. A temperature of the curie metal element increases in response to temperature increases in the dielectric fluid and/or fault conditions in the circuitry. As the temperature of the curie metal element increases, the magnetic coupling between the magnet and the curie metal element releases, causing movement of a first actuator coupled to the magnet. The first actuator causes the trip mechanism to open the circuit.

A float member of the circuit breaker includes material that is responsive to changes in the dielectric fluid level in the transformer. The float member material has slightly less than neutral buoyancy, which allows the float member to float when dielectric fluid is present and to weigh a significant amount when the dielectric fluid is removed. As the dielectric fluid level drops, the float member drops and moves a second actuator, which causes the trip mechanism to open the circuit. The float member and second actuator operate independently of the magnet, curie metal element, and first actuator such that the float member and second actuator can cause the circuit to open without releasing the magnetic coupling between the magnet and metal element.

In one embodiment, a circuit breaker for a transformer includes (a) fault interrupting means for causing circuitry in the transformer to open upon a fault condition in the transformer, and (b) low oil trip means for causing the circuitry to open when a level of dielectric fluid in a tank of the transformer is below a threshold level. The low oil trip means operates independently of the fault interrupting means to open the circuitry without actuating any components of the fault interrupting means.

In another embodiment, a circuit breaker for a transformer includes a stationary contact configured to be electrically coupled to a circuit of a transformer. The circuit breaker includes a movable contact, a member coupled to the movable contact, and a tripping apparatus that moves the member to move the movable contact relative to the stationary contact to open and close the circuit. The circuit breaker also includes a fault interrupting apparatus that causes the tripping apparatus to open the circuit upon a fault condition in the transformer, and a low oil trip apparatus that causes the tripping apparatus to open the circuit when a level of dielectric fluid in a tank of the transformer is below a threshold level. The low oil trip apparatus operates independently of the fault interrupting apparatus to open the circuitry without actuating any components of the fault interrupting apparatus. As used herein, the term "apparatus" can include only one component or multiple components that may or may not be coupled to one another.

In yet another embodiment, a circuit breaker assembly for a transformer includes a plurality of circuit breakers. Each circuit breaker includes a fault interrupting means for causing transformer circuitry associated with the circuit breaker to open upon a fault condition in the transformer, and low oil trip means for causing the circuitry to open when a level of dielectric fluid in a tank of the transformer is below a threshold level. The low oil trip means operates independently of the fault interrupting means to open the circuitry without actuating any components of the fault interrupting means. A linkage bar is coupled to each of the circuit breakers and rotates in response to the fault interrupting means of one of the circuit breakers causing the transformer circuitry associated with the one of the circuit breakers to open. The rotating of the linkage bar causes the fault interrupting means of each other circuit breaker to open the transformer circuitry associated with the other circuit breaker.

In another embodiment, a method for protecting circuitry of a transformer, includes the steps of (a) determining whether a fault condition exists in a transformer; (b) in response to determining that a fault condition exists in the transformer, releasing a magnetic coupling to cause circuitry in the transformer to open; (c) determining whether a level of dielectric fluid in a tank of the transformer is below a threshold level; and (d) in response to determining that the level of dielectric fluid is below the threshold level, causing the circuitry in the transformer to open without releasing the magnetic coupling.

These and other aspects, objects, features, and embodiments will become apparent to a person of ordinary skill in the art upon consideration of the following detailed description of illustrative embodiments exemplifying the best mode for carrying out the invention as presently perceived.

BRIEF DESCRIPTION OF THE DRAWINGS

For a more complete understanding of the invention and the advantages thereof, reference is now made to the following description, in conjunction with the accompanying figures briefly described as follows.

DETAILED DESCRIPTION OF EXEMPLARY EMBODIMENTS

Figure 1:
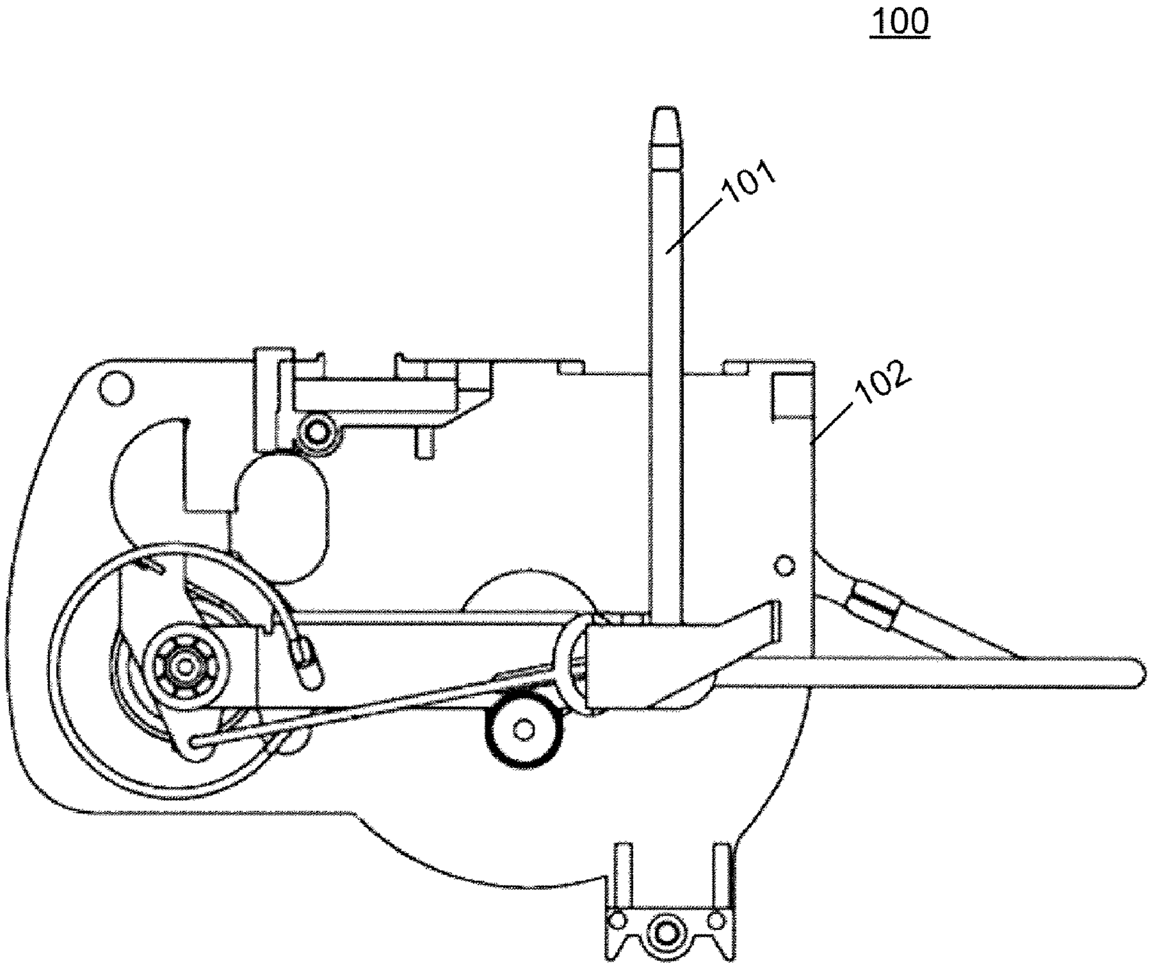
FIG. 1 is a side elevational view of a circuit breaker in a normal operating position, with certain elements removed for clarity.
Figure 2:
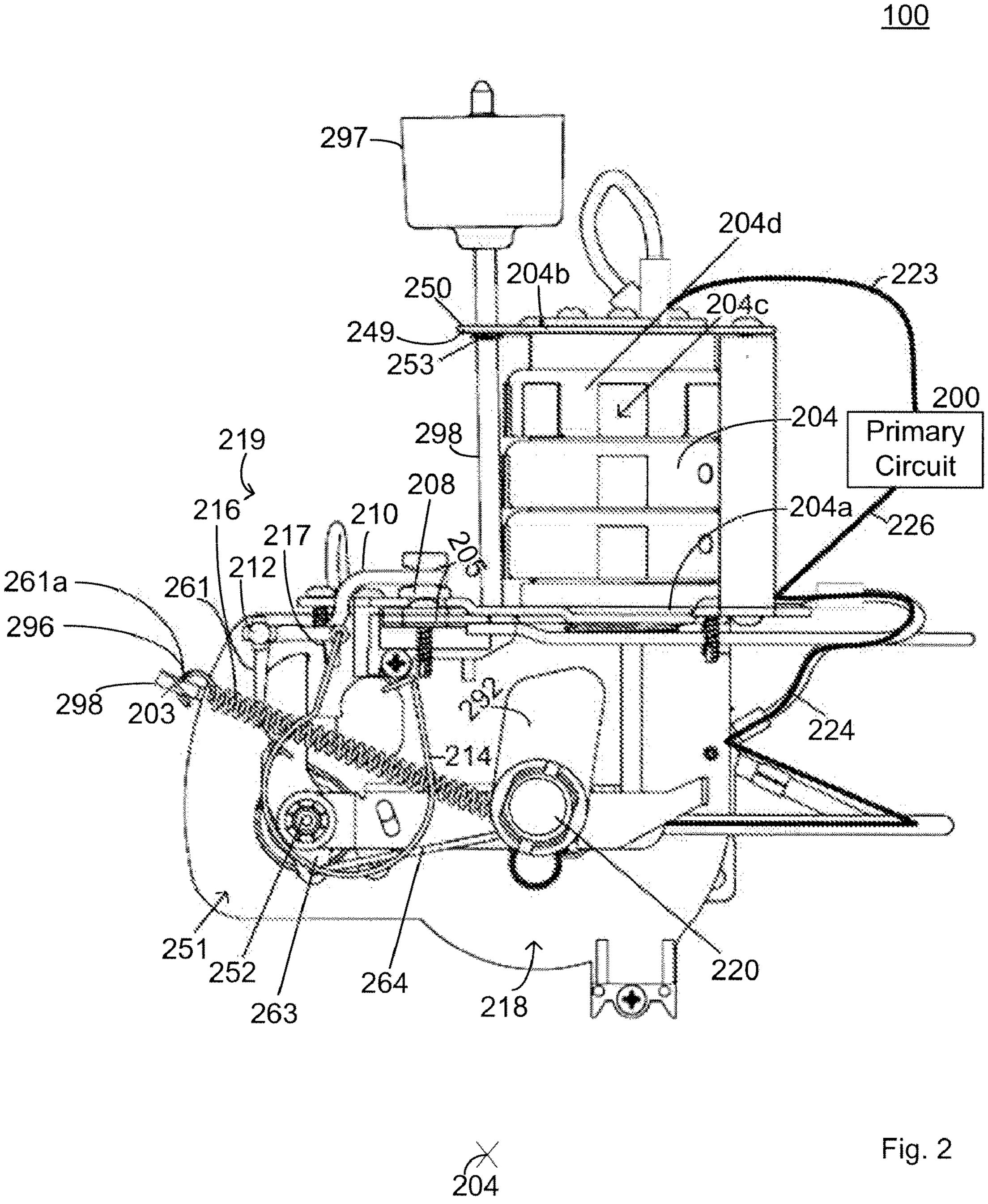
FIG. 2 is a side elevational view of the circuit breaker depicted in FIG. 1, in a normal operating position.
Figure 3:
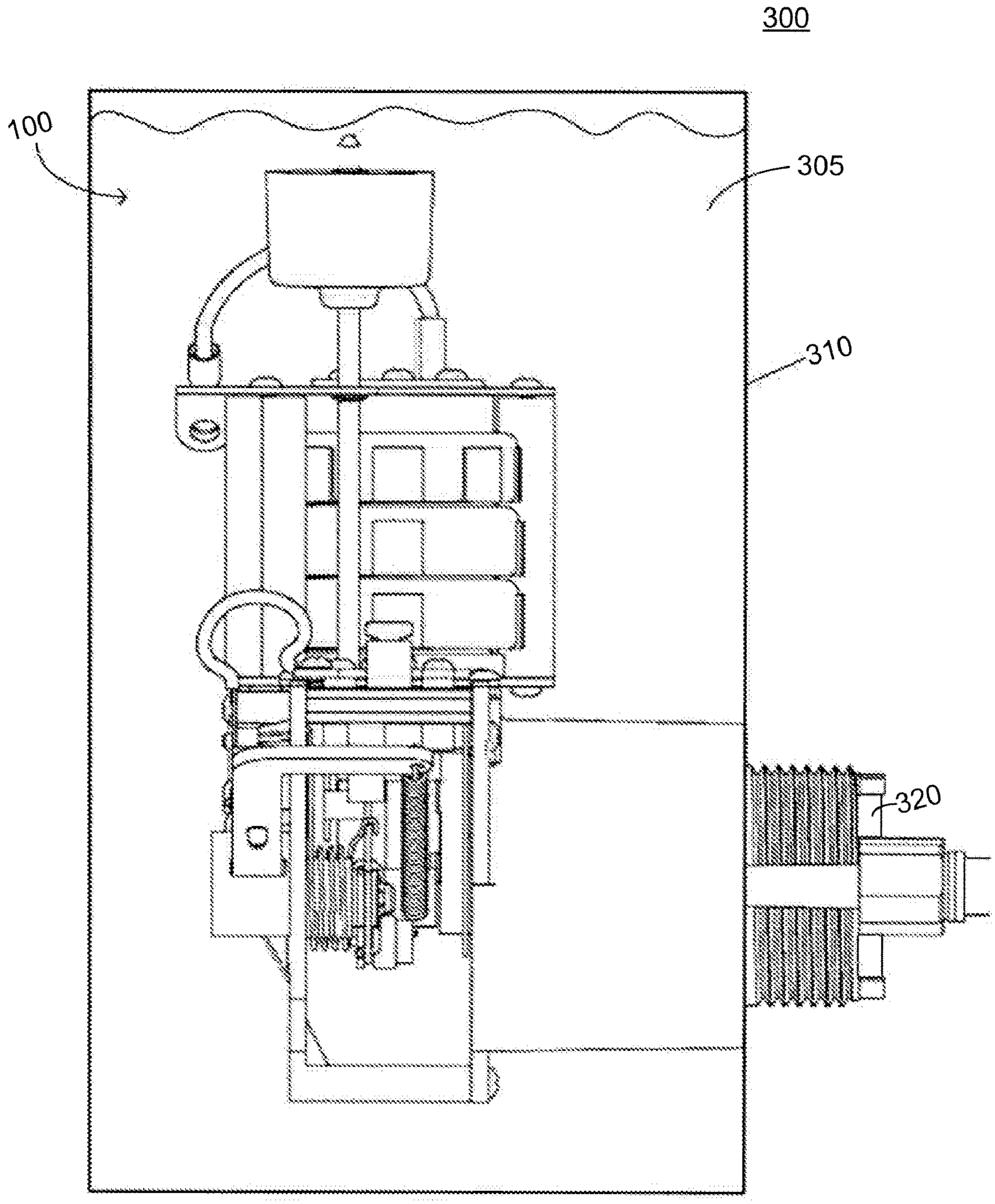
FIG. 3 is a side elevational view of the circuit breaker depicted in FIG. 1, in a normal operating position.

Turning now to the drawings, in which like numerals indicate like elements throughout the figures, exemplary embodiments are described in detail. FIGS. 1-4 illustrate a circuit breaker 100 for a transformer 300 (FIG. 3). With reference to FIGS. 1-4, the circuit breaker 100 is immersed in dielectric fluid 305 in a tank 310 of the transformer 300 and connected in series with a primary circuit 200 of the transformer 300. The circuit breaker 100 is operable to open the primary circuit 200 in response to detected fault currents and temperature levels of the dielectric fluid 305, as described below.

The circuit breaker 100 includes a frame or base 102 to which an arc extinguishing assembly 204 is coupled. The arc extinguishing assembly 204 includes a central core formed of an arc extinguishing material, such as a polyester, which is enclosed within a housing **204*d*. The core includes a bore with a base 204*a* at the bottom and a cap 204*b* at the top. The base 204*a* and cap 204*b*** may be formed as integral parts of the core.

The space between the base **204*a* and the cap 204*b* defines an arc chamber 204*c* which is open to the bore through openings in the core. The openings allow gases created by arcing during interruption or opening of the circuit breaker 100 to expand into the arc chamber 204*c*. The expanding gases are confined in the arc chamber 204*c* by the housing 204*d*. A relief port may be provided on the periphery of the cap 204*b* to allow for the restricted discharge of oil and/or gases from the arc chamber 204*c* on interruption and to allow for the ingress of dielectric fluid into the arc chamber 204*c* when the circuit breaker 100 is immersed in the dielectric fluid 305. All of the axial forces of the expanding gases are confined to the space between the base 204*a* and the cap 204*b***.

Figure 6:
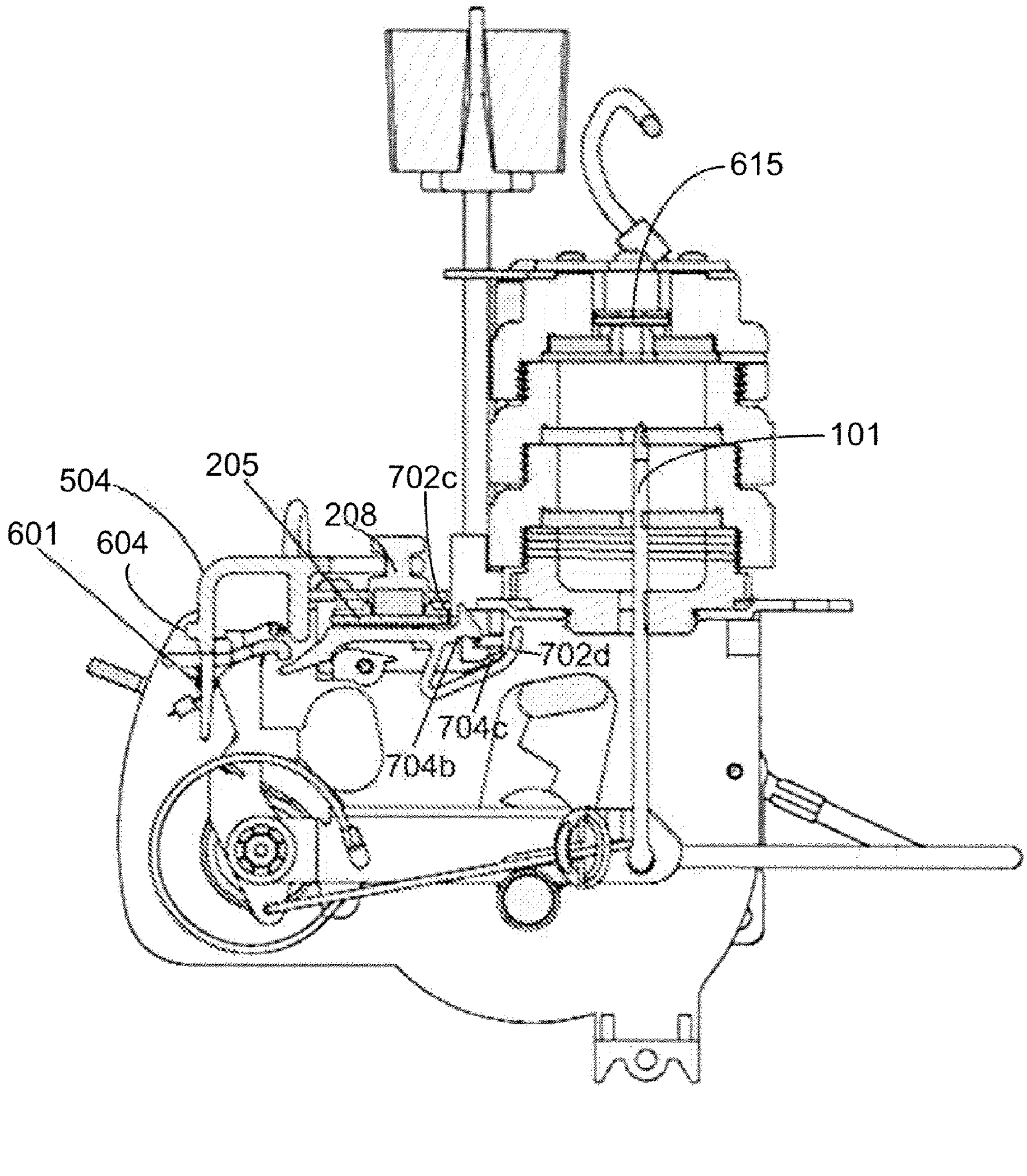
FIG. 6 is a side cross-sectional view of the circuit breaker depicted in FIG. 5, in a normal operation position.

The upper end of the bore is closed by means of a conductive contact 615 (FIG. 6) provided in the arc extinguishing assembly 204. The contact 615 is electrically coupled to the primary circuit 200 via a high voltage input line 223. A conductive rod 101 is movable within the bore of the arc extinguishing assembly 204 to open and close the primary circuit 200. When the conductive rod 101 engages the conductive contact 615, the primary circuit 200 is closed; when the conductive rod 101 is separated from the conductive contact 615, the primary circuit 200 is opened.

Figure 4:
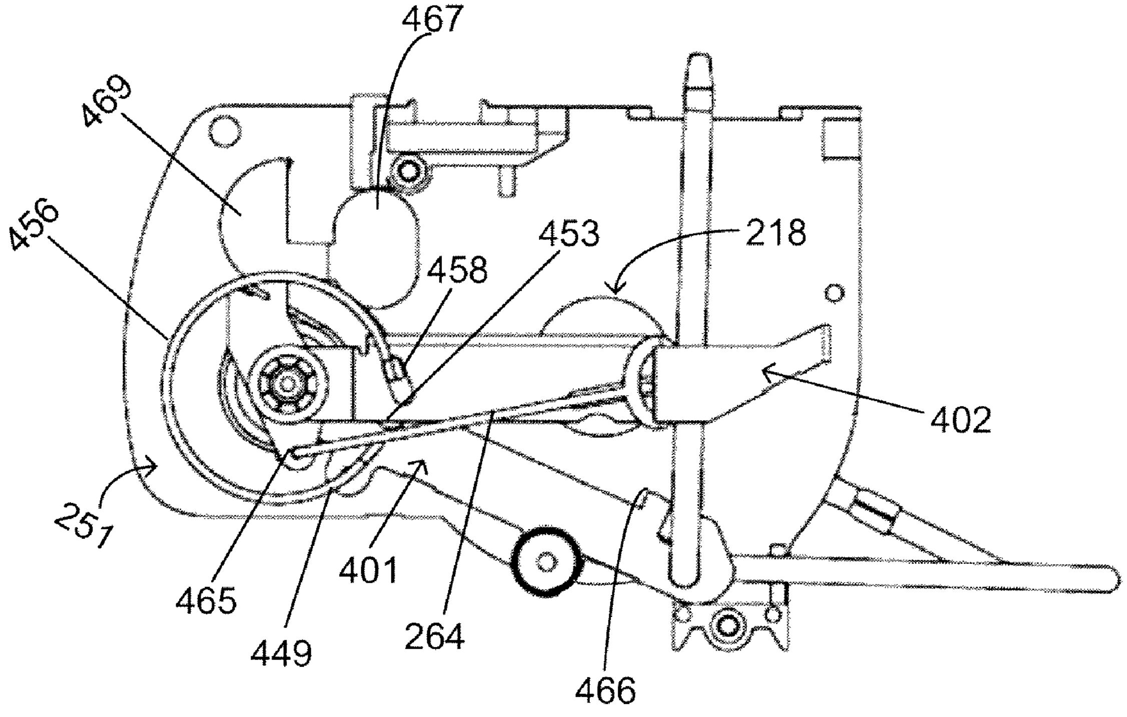
FIG. 4 is a side elevational view of the circuit breaker depicted in FIG. 1, in a tripped position.
Figure 5:
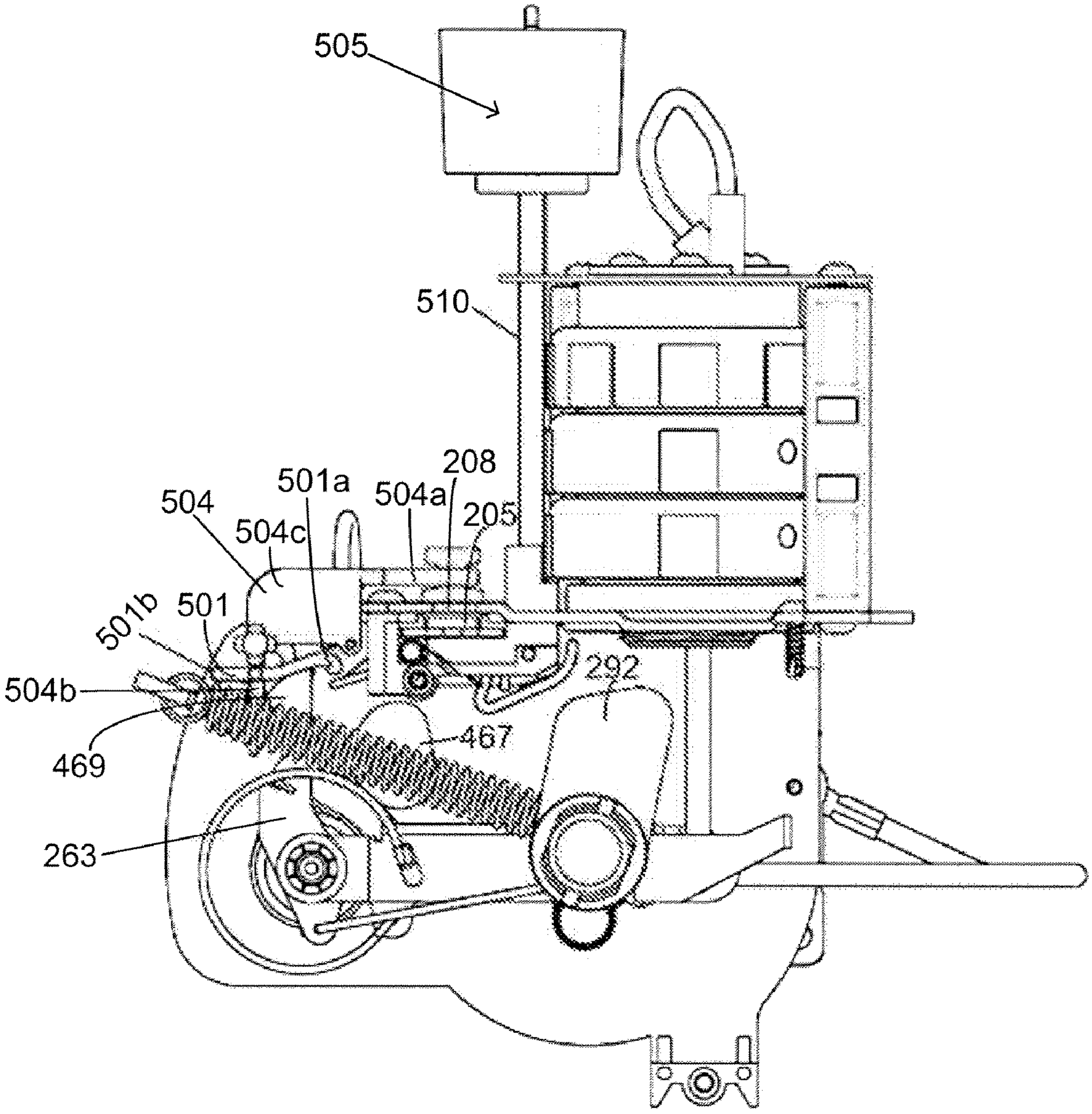
FIG. 5 is a side elevational view of a circuit breaker in a normal operating position, in accordance with certain exemplary embodiments.

A latch mechanism 218 is operable to move the conductive rod 101 to open and close the primary circuit 200. As best seen in FIG. 4, the latch mechanism 218 includes a first lever arm 401, a second lever arm 402, and a trip assembly 251. The first lever arm 401 is normally latched or locked to the second lever arm 402 and is released from the lever arm 402 by the trip assembly 251 to open the circuit breaker 100 under a fault condition. More particularly, the first lever arm 401 is pivotally mounted at one end on a pivot pin 252 provided in the frame 102. The conductive rod 101 is coupled to the other end of the lever arm 401. Pivotal movement of the lever arm 401 moves the conductive rod 101 axially in the bore of the arc extinguishing assembly 204, into and out of engagement with the conductive contact 615.

Figure 7:
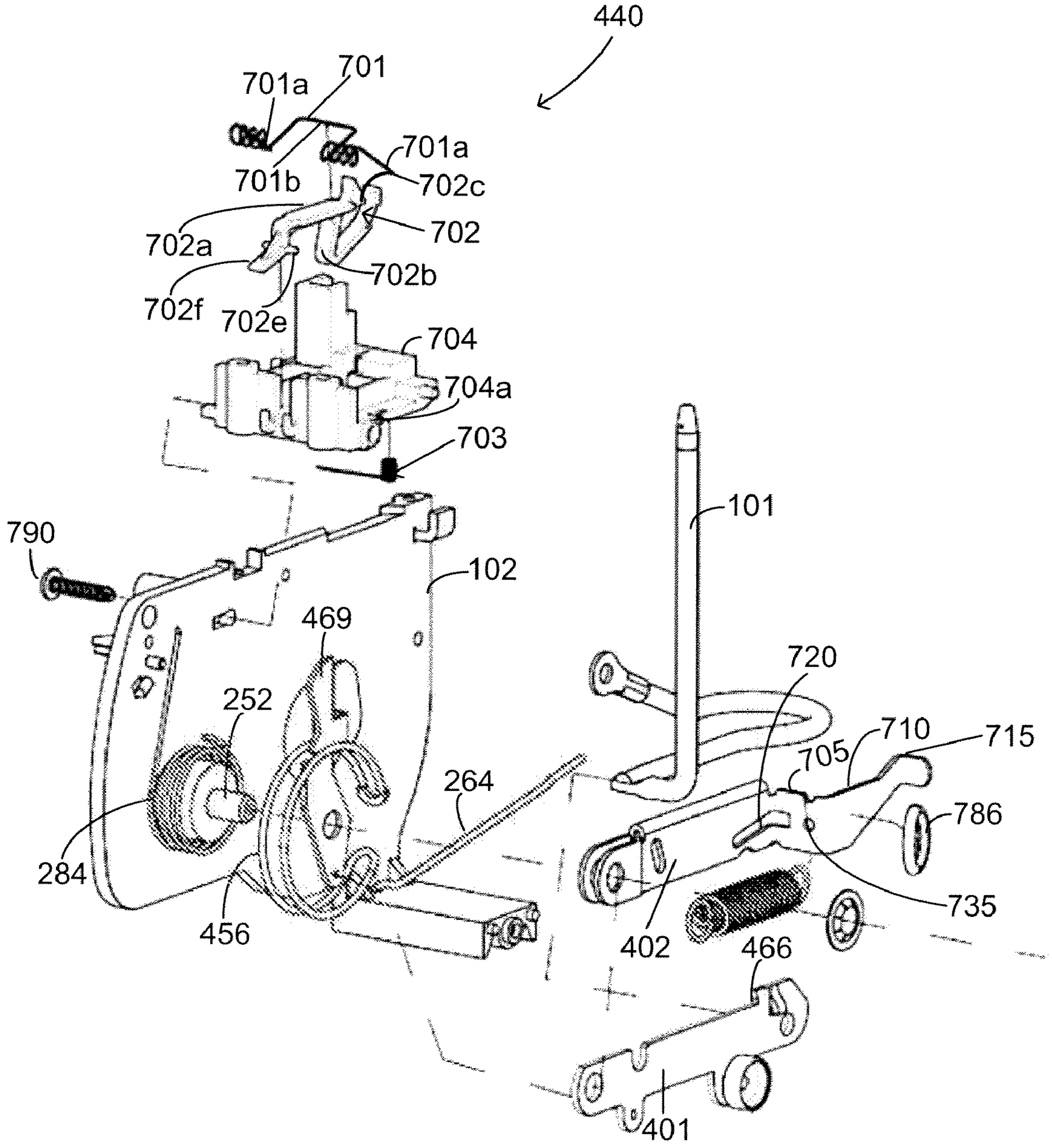
FIG. 7 is an exploded perspective side view of the circuit breaker depicted in FIG. 5, with certain elements removed for clarity.

The second lever arm 402 is pivotally mounted on the pin 252 and is bent in the form of a "U" (as best seen in FIG. 7) to provide a slot to straddle the first lever arm 401. The lever arm 401 is held in the slot by a rod 264, which is movable into engagement with a flange 466 provided on the lever arm 401.

With reference to FIGS. 1-4 and 7, the end of lever arm 402 proximate the conductive rod 101 is bent at a substantially right angle to form an extension 705 (FIG. 7), which is bent at a second substantially right angle to form a stop arm 710 (FIG. 7). An end 715 (FIG. 7) of the stop arm 710 is bent at a substantially right angle to form a limit stop to downward motion of the lever arm 402. The extension 705 includes a guide slot 720 for the rod 264 and a main spring opening 735.

The trip assembly 251 includes a trip lever 263 mounted for pivotal motion on the pin 252 and the rod 264. The trip lever 263 includes an opening 465 at one end and a first cam 467 and second cam 469 at the other end. The rod 264 has one end bent to enter the opening 465 in the trip lever 263. The other end of the rod 264 extends through the guide slot 720 in the lever arm 402, to position the rod 264 to engage the flange 466 on the lever arm 401. An o-ring 786 disposed around the extension 705 biases the rod 264 against the flange 466. The rod 264 is pulled out from the flange 466 on rotation of the trip lever 263 clockwise and pushed toward the flange 466 on rotation of the trip lever 263 counter-clockwise.

The lever arms 401 and 402 are normally biased in opposite directions by a spring 456. The spring 456 is anchored in openings 449 and 458 in the lever arms 401 and 402, respectively. A slot 453 in the lever arm 401 provides clearance for the end of the spring 456 anchored in the opening 458. When the rod 264 engages the flange 466, the lever arms 401 and 402 will move together, as a unit. On disengagement of the rod 264 from the flange 466, the lever arm 401 will rotate away from the lever arm 402, pulling the conductive rod 101 away from the conductive contact 615, thereby opening the primary circuit 200.

Once the circuit breaker 100 has been tripped to the open position, the trip mechanism may be reset by: (a) rotating the lever arm 402 clockwise into alignment with the lever arm 401, (b) re-coupling the lever arms 401 and 402 together by repositioning the rod 264 within the flange 466, and (c) rotating the lever arms 401 and 402, as a unit, counter-clockwise so that the conductive rod 101 electrically engages the conductive contact 615. This is accomplished, in part, using an overcenter spring 261, which is moved between an upper position and a lower position by means of a crank shaft 220. In the upper position, an end 261*a* of the spring 261 is disposed at point 203; in the lower position, the end 261*a* is disposed at point 209. The end 261*a* of the spring 261 is connected to an opening 296 in a yoke 298 that is mounted on the crank shaft 220. The other end of the spring 261 is connected to the spring opening 735 on the extension 705 of the lever arm 402. The crank shaft 220 is operable to be rotated manually by means of an external handle 320. The yoke 298 is rotated counterclockwise from the circuit breaker open position shown in FIG. 4 to the circuit breaker closed position shown in FIG. 2. As the spring 261 is rotated past the pivot axis of the pin 252, the bias force of the spring 261 on the lever arm 402 is reversed. As the spring 261 moves overcenter, the lever arm 402 will snap either upward or downward.

Means are provided to assure the engagement of the rod 264 with the flange 466 when the lever arm 402 is snapped to the down position, in realigning the lever arm 402 with the lever arm 401. Such means is in the form of a crank shaft section 292 of the crank shaft 220. The crank shaft section 292 is rotated manually toward the first cam 467 of the trip lever 263 and engages the first cam 467 to rotate the trip lever 263 counterclockwise on the pin 252. The motion of the trip lever 263 pushes the rod 264 toward the flange 466.

Continued rotation of the section 292 will move the end of the rod 264 to a position below the flange 466. To ensure that the rod 264 moves under the flange 466 when the lever arm 402 is snapped down by the spring 261, the crank shaft 220 is rotated far enough to move the section 292 against the lever arm 402. The o-ring 786 biases the rod 264 laterally toward the flange 466. When the section 292 is rotated against the lever arm 402, the rod 264 will be moved below the flange 466, allowing the o-ring 786 to bias the rod 264 against the side of the lever arm 402.

Once the rod 264 is positioned in the flange 466 and the lever arms 401 and 402 are thereby secured together, the circuit breaker 100 may be reset by rotating the crank shaft 220 clockwise. On rotation of the crank shaft 220 clockwise, the yoke 298 will be returned to the position shown in FIG. 2, reversing the bias of the spring 261 on the lever arm 402, causing it to rotate counterclockwise. Because the rod 264 is now engaged with the flange 466, the lever arm 401 will follow the upward motion of the lever arm 402. The motion of the lever arm 401 will move the conductive rod 101 upward in the bore of the arc extinguishing assembly 204, into engagement with the contact 615, to close the primary circuit 200.

Tripping of the circuit breaker 100 is controlled by a temperature sensing assembly 219, which includes a magnet 208. As a material approaches the curie temperature, the magnetic properties of the material will be reduced, resulting in a loss of attraction to a corresponding magnet. A metal element 205 of the circuit breaker 100 is immersed in the dielectric fluid of the transformer and operatively positioned to sense the heat of a fault current on the primary circuit 200 thereof. The metal element 205 will respond to both the temperature of the dielectric fluid and the temperature of any fault current.

The trip assembly 219 includes a bell crank 210 pivotally mounted on a pin 212 in the frame 102. The magnet 208 is mounted on one end of the bell crank 210, in a position to engage the metal element 205. The metal element 205 includes a folded coil with electrical insulation between the folds. The metal element 205 is connected in series with lines 224 and 226. Line 224 is electrically coupled to the conductive rod 101. Line 226 is electrically coupled to the primary circuit 200 and is an output line of the circuit breaker 100.

Under normal load, the resistance of the folded coil will increase the temperature of the metal element 205 slightly. Under fault conditions, an immediate temperature rise will occur in the folded coil. The bell crank 210 includes an actuating end 216 and a latch member 217. A spring 214 biases the bell crank 210 in a counterclockwise direction.

The rotary motion of the bell crank 210 will move the latch member 217 away from the cam 469 of the trip lever 263 and will move the end 216 of the bell crank 210 into engagement with the cam 469. As best seen in FIG. 7, a spring 284 coupled to the frame 102 and the cam 469 of the trip lever 263 biases the cam 469 in the clockwise direction. When the latch member 217 is moved away from the cam 469, the spring 284 actuates the cam 469 in the clockwise direction, pulling the rod 264 away from the lever arm 401. Rotation of the bell crank 210 also may cause the actuating end 216 to assist with rotation of the trip lever 263 clockwise.

The magnet 208 prevents the bell crank 210 from rotating due to the bias of the spring 214. The magnetic force of the magnet will hold the magnet 208 against the element 205. In the event of a fault in the primary circuit 200 of the transformer 300, the temperature of the folded coil will increase the temperature of the element 205 in relation to the fault current. The resistance of the folded coil will produce an immediate rise in the temperature of the metal element 205. As the element temperature approaches the curie temperature, the magnetic holding force of the magnet 208 will be reduced, thereby reducing the magnetic attraction of the magnet 208 to the metal element 205 and allowing the bell crank 210 to rotate due to the bias of the spring 214. The same condition will occur if the dielectric fluid temperature increases the temperature of the metal element 205.

The temperature sensing assembly 219 is reset on the counterclockwise rotation of the crank shaft 220. The crank shaft section 292 of the crank shaft 220 will engage the cam 467 to rotate the trip lever 263 counterclockwise. The cam 469 will engage the end 216 of the bell crank 210, rotating the bell crank 210 clockwise. As the magnet 208 is moved into close proximity to the metal element 205, the magnetic force of the magnet 208 will provide the final movement in resetting the temperature responsive assembly.

The circuit breaker 100 includes a low oil lockout functionality that causes the circuit breaker 100 to become unusable in the event that a level of the dielectric fluid in the transformer tank 310 drops unacceptably low. The circuit breaker 100 includes a float member 297 that includes material that is responsive to changes in the dielectric fluid level in the transformer. In particular, the float member 297 material has slightly less than neutral buoyancy, which allows the float member 297 to float when dielectric fluid is present and to weigh a significant amount when the dielectric fluid is removed.

As the dielectric fluid level drops, the float member 297 and an insulating rod 298 connected thereto move axially downward. The insulating rod 298 is supported in an opening (not shown) in the frame 102 and an opening 249 in a guide plate 250 coupled to the arc extinguishing assembly 204. When the float member 297 and insulating rod 298 are in a normal operating position in which the dielectric fluid level is satisfactory, a bottom end of the insulating rod is disposed above the crank shaft section 292 and is prevented from further upward movement by a pin 253 which engages the guide plate 250. When the float member 297 and insulating rod 298 move downward in response to a drop in the dielectric fluid level, the bottom end of the insulating rod 298 is disposed in the path of motion of the crank shaft section 292, preventing manual opening of the circuit breaker 100.

FIGS. 5-8 illustrate a circuit breaker 500 in accordance with certain exemplary embodiments. The circuit breaker 500 is similar to the circuit breaker 100 described above in connection with FIGS. 1-4 except that the circuit breaker 500 includes a modified trip mechanism with a low oil trip functionality. With reference to FIGS. 5-8, the modified trip mechanism includes a modified bell crank 504, a lever 501, and a float lever mechanism 740, which enable the circuit breaker 500 to open in response to an unacceptably low level of dielectric fluid 305.

The modified bell crank 504 includes a first end 504*a* and a second end 504*b*. The magnet 208 is coupled to the first end 504*a*. The ends 504*a* and 504*b* are disposed substantially perpendicular to one another, with a member 504*c* being disposed between the ends 504*a* and 504*b*.

Figure 8:
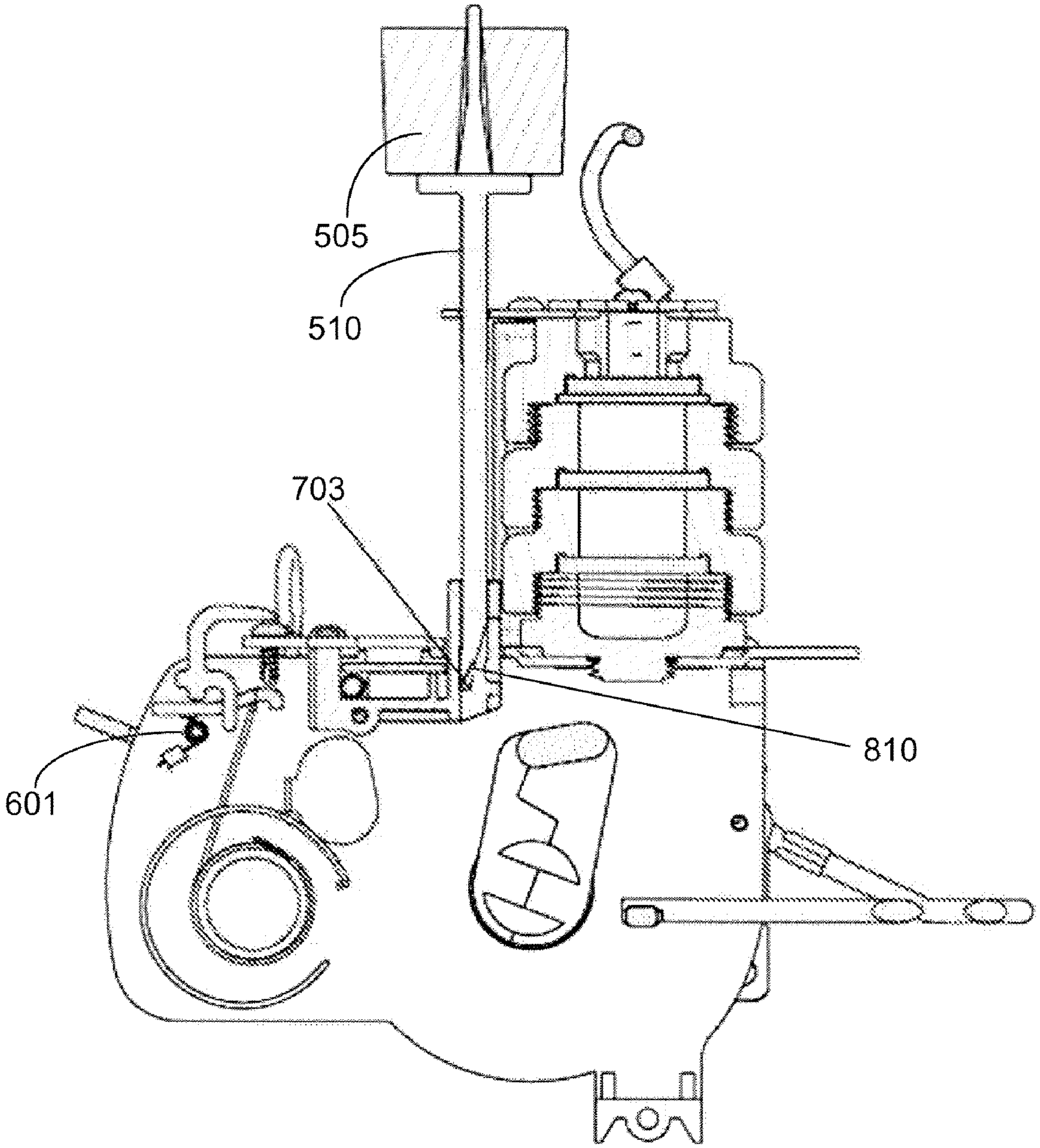
FIG. 8 is a side cross-sectional view of the circuit breaker depicted in FIG. 5, in a normal operation position, with certain elements removed for clarity.

The lever 501 is coupled to the end 504*b* and is disposed substantially between the cam 469 and the member 504*c*. As best seen in FIG. 8, a spring 601 is coupled to the lever 501 and the end 504*b* and biases the lever 501 in a clockwise direction. The end 501*a* of the lever 501 engages the cam 469 and prevents the cam 469 from rotating clockwise to trip the circuit breaker 500 absent a force from the bell crank 504 or a force from the float lever mechanism 740, as described below.

The bell crank 504 rotates counterclockwise in response to a fault condition, substantially as described above in connection with the bell crank 210 of the circuit breaker 100. When the bell crank 504 rotates counterclockwise, a protrusion 604 on a side of the bell crank 504 actuates an end 501*b* of the lever 501 in the counterclockwise direction, releasing the cam 469 from the lever 501 and allowing the spring 284 to cause the cam 469 to rotate clockwise to trip the circuit breaker 500.

The float lever mechanism 740 includes a float lever 702, a float lever bias spring 701, a catch spring 703, and a base member 704. The base member 704 is coupled to the frame 102 via a screw 790 or other fastener. The float lever 702 is disposed substantially within a cavity 704*a* of the base member 704, with a bottom portion 702*b* of the float lever 702 being disposed beneath the base member 704 and edges 702*c* and 702*d* of the float lever 702 engaging corresponding edges 704*b* and 704*c*, respectively, of the base member 704. The float lever 702 is pivotable within the cavity 704*a*, substantially on a pivot point 702*e*.

The float lever bias spring 701 includes ends 701*a* that are coupled to the base member 704. For example, each end 701*a* can be coupled to the base member 704 by engaging a corresponding notch 704*a* in a side edge of the base member 704. A middle portion 701*b* of the float lever bias spring 701*b* rests on a top portion 702*a* of the float lever 702. The float lever bias spring 701 biases the float lever 702 in a clockwise direction. The edge 702*c* of the float lever 702 rests on the catch spring 703.

As the level of dielectric fluid 305 in the transformer 300 drops, the float member 505 and an insulating rod 510 coupled thereto begin to drop, substantially as described above in connection with the float member 297 and insulating rod 298 of the circuit breaker 100. As best seen in FIG. 8, the bottom end of the insulating rod 510 includes an angled surface 810, which pushes the catch spring 703 laterally within the frame 102. In certain exemplary embodiments, the frame 102 constrains the catch spring 703 and rod 805 so that the catch spring 703 only can rotate within the horizontal plane, and the rod 805 only can move axially.

The weight of the float member 505 is such that it will push the catch spring 703 out of the way of the lever 702, allowing the float lever bias spring 701 to move the lever 702 in a clockwise direction. When the lever 702 moves clockwise, an end 702*f* of the lever 702 actuates an end 501*a* of the lever 501 in a counterclockwise direction, overcoming the bias force of the spring 601. This movement of the lever 501 releases the cam 469 so that the spring 284 can move the cam 469 clockwise, thereby causing the circuit breaker 500 to open.

The circuit breaker 500 can be manually reset from the open position to the closed position substantially as described above in connection with the circuit breaker 100. With reference to FIGS. 1-8, the circuit breaker 500 may be reset by: (a) rotating the lever arm 402 clockwise into alignment with the lever arm 401, (b) re-coupling the lever arms 401 and 402 together by repositioning the rod 264 within the flange 466, and (c) rotating the lever arms 401 and 402, as a unit, counterclockwise so that the conductive rod 101 electrically engages the conductive contact 615.

Depending on the level of dielectric fluid 305 in the transformer 300 during the reset operation, the float 505 may be in the up position (corresponding to an adequate level of dielectric fluid) or in the down position (corresponding to an inadequate level of dielectric fluid). If the float 505 is in the up position, the insulating rod 510 is disposed above the crank shaft section 292. The crank shaft section 292 moves past the underside of the float lever 702, pushing it up and charging the float lever bias spring 701. The catch spring 703 moves out of the way during the reset operation and snaps back under the float lever 702 when fully reset. If the float 505 is in the down position during the reset operation, the insulating rod 510 is disposed in the path of motion of the crank shaft section 292, restricting movement of the crank shaft section 292 and preventing the operator from re-energizing the circuit breaker 500.

Thus, the circuit breaker 500 includes: (a) a "fault trip" functionality for causing the circuit breaker 500 to open in response to a fault current or other temperature increase, (b) a "low oil trip" functionality for causing the circuit breaker 500 to open when the dielectric fluid 305 drops to an unacceptable level, and (c) a "low oil lock-out" functionality for disallowing the circuit breaker 500 to be reset when there is an unacceptable level of dielectric fluid 305 in the transformer tank 300. The fault trip functionality operates substantially independent of the low oil trip and low oil lock-out functionality. In particular, the circuit breaker 500 may experience a low oil trip without releasing the magnet 208 or rotating the bell crank 504. Instead, the low oil trip merely requires the insulating rod 510 to actuate the lever 702.

The amount of force required to actuate the lever 702 is minimal. Generally, the amount of force required is about 0.05 pounds. In contrast, the amount of force required to release the magnet 208 is about two pounds. By actuating the lever 702 without releasing the magnet 208, the required force is reduced by about 97.5%. Less required force is advantageous because it allows the float to weigh less and displace less dielectric fluid 305 in the transformer tank 310. For example, the float may weigh only about 40 grams. In certain exemplary embodiments, the float includes a buoyant foam material, such as Nitrile Butadiene Rubber (NBR) or another high temperature closed cell foam. The foam material also may include a dense material, such as steel, to provide necessary weight for operating the float. For example, the float may include foam that has been injected with steel members.

Figure 9:
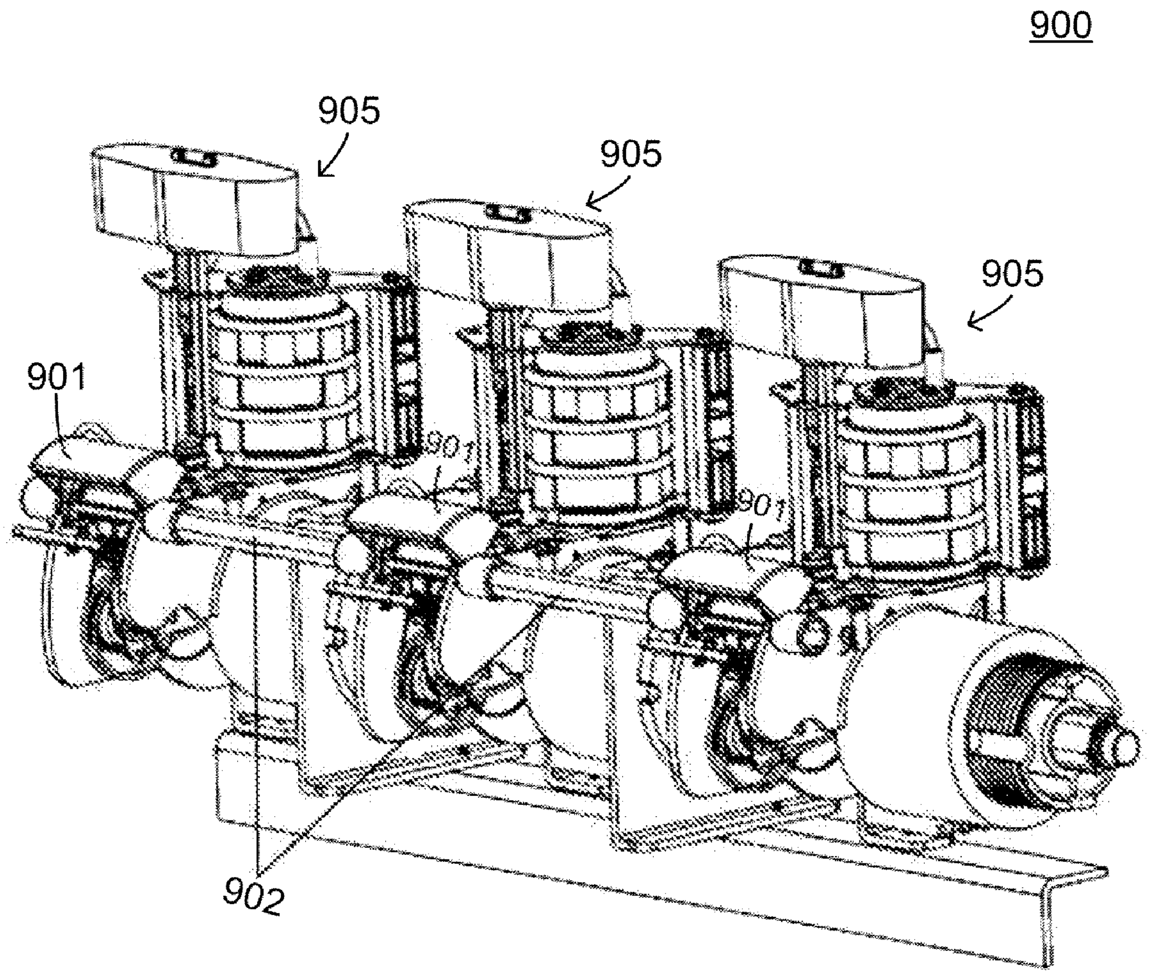
FIG. 9 is a side perspective view of a circuit breaker mechanism, in accordance with certain alternative exemplary embodiments.

FIG. 9 is a side perspective view of a circuit breaker mechanism 900, in accordance with certain alternative exemplary embodiments. With reference to FIG. 9, the circuit breaker mechanism 900 includes three circuit breakers 905 that are mounted such that operating shafts of the circuit breakers 905 are linked together. For example, each circuit breaker 905 may be substantially similar to the circuit breaker 100 depicted in FIGS. 1-4 or the circuit breaker 500 depicted in FIGS. 5-8. Each circuit breaker 905 is associated with and electrically coupled to a different circuit or portion of the same circuit. For example, each circuit breaker 905 may be electrically coupled to a different phase of a three-phase power system. Although depicted in FIG. 9 as including three circuit breakers 905, a person of ordinary skill in the art having the benefit of the present disclosure will recognize that the circuit breaker mechanism 900 can have any number of circuit breakers 905 in alternative exemplary embodiments.

Figure 10:
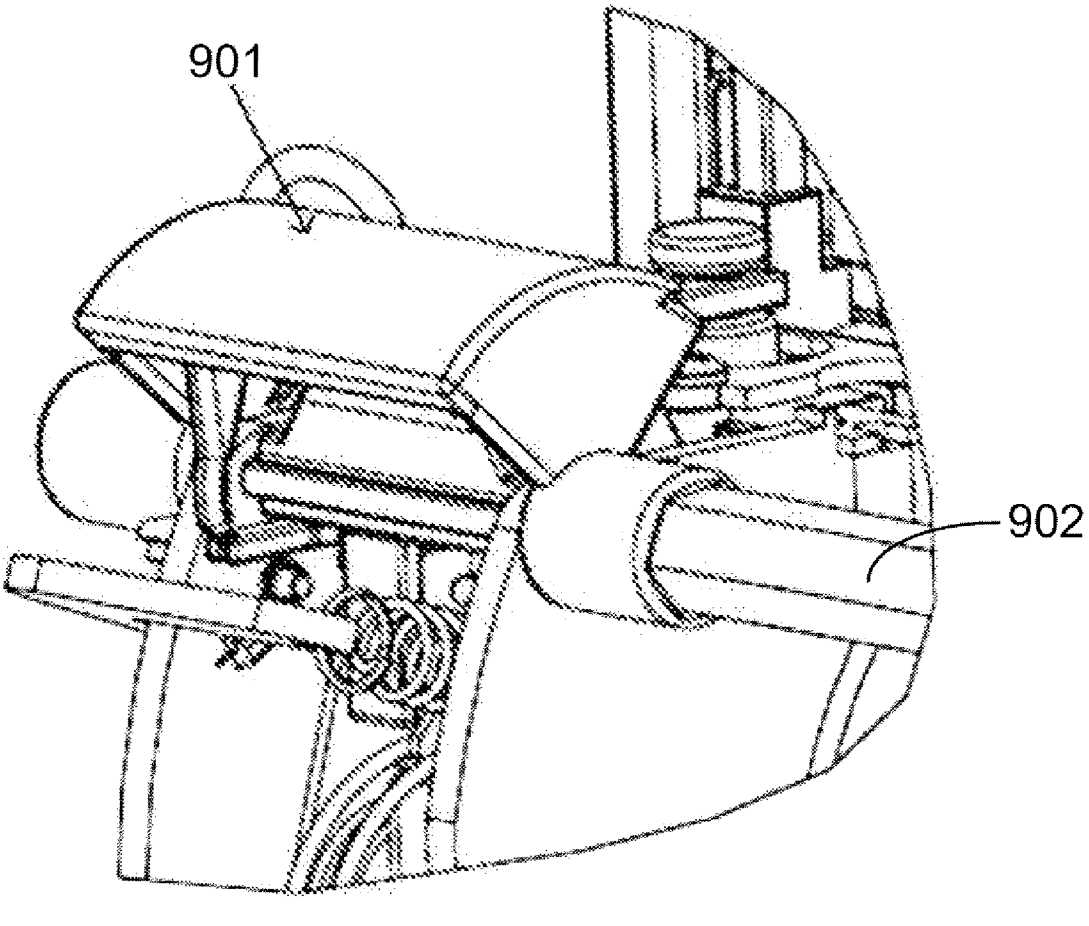
FIG. 10 is a side perspective view of a trip collar of the circuit breaker mechanism depicted in FIG. 9, in accordance with certain exemplary embodiments.

The bell crank (not shown) of each circuit breaker 905 is coupled to a trip collar 901 of the circuit breaker 905. FIG. 10 is a side perspective view of the trip collar 901, in accordance with certain exemplary embodiments. With reference to FIGS. 9 and 10, the trip collars 901 of all the circuit breakers 905 are coupled to one another via at least one linkage bar 902. Rotation of the bell crank on one circuit breaker 905 causes the trip collar 901 on that circuit breaker 905 to rotate, thereby causing the linkage bar 902 to rotate. That rotation of the linkage bar 902 causes the trip collars 901 and bell cranks on the other circuit breakers 905 to rotate, tripping all of the linked circuit breakers 905.

In certain exemplary embodiments, a common solenoid (not shown) may be mounted to electronically trip one or more of the circuit breakers 905. For example, the solenoid may rotate the lever 501 on a circuit breaker 905 of the type depicted in FIGS. 5-8. In addition, or in the alternative, the solenoid may rotate the trip collar 901 and linkage bar 902 on a three phase circuit breaker mechanism 900 of the type depicted in FIG. 9. This may be accomplished with a rotary solenoid or a linear solenoid on a simple linkage bar 902.

To provide a thermal trip, a common bimetallic snap action structure or device such as a wax motor, that uses change of state or internal crystalline or mechanical structures to provided needed force over a distance, may be used to rotate the lever 501 on a circuit breaker 905 of the type depicted in FIGS. 5-8 and/or the trip collar 901 and linkage bar 902 on a three phase circuit breaker mechanism 900 of the type depicted in FIG. 9. The device may be used to automatically trip and reset each circuit breaker 905. Alternatively, each circuit breaker 905 may be manually reset as described above in connection with the circuit breakers 100 and 500.

Although specific embodiments have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A circuit breaker for a transformer, comprising:

a tripping apparatus that moves a movable contact relative to a stationary contact to open and close a circuit, wherein the tripping apparatus comprises a first lever arm coupled to the movable contact and a second lever arm coupled to a rod, wherein the rod is detachably coupled to the first lever arm such that when the rod is detached from the first lever arm, the first lever arm descends moving the movable contact;

fault interrupting means for causing the tripping apparatus to move the movable contact upon a fault condition in the transformer; and low oil trip means for causing the tripping apparatus to move the movable contact when a level of dielectric fluid in a tank of the transformer is below a threshold level, wherein the low oil trip means operates independently of the fault interrupting means to open the circuit without actuating any components of the fault interrupting means.

2. The circuit breaker of claim 1, wherein the fault interrupting means comprises:

a magnet; and a curie metal element electrically coupled to the circuit and configured to release a magnetic coupling between the magnet and the curie metal element to open the circuit upon the fault condition, wherein the low oil trip means causes the circuit to open without releasing the magnetic coupling between the magnet and the curie metal element.

3. The circuit breaker of claim 2, wherein the fault interrupting means further comprises an actuator coupled to the magnet and configured to move in conjunction with the magnet, wherein release of the magnetic coupling between the magnet and the curie metal element moves the actuator to cause the circuit to open.

4. The circuit breaker of claim 1, wherein the low oil trip means comprises:

a float member configured to float in the dielectric fluid;

a low oil rod coupled to the float member; and wherein the float member is configured to apply a force to the low oil rod to actuate the second lever arm when the level of dielectric fluid in the tank recedes below the threshold level, actuation of the second lever arm causing the circuit to open.

5. The circuit breaker of claim 1, wherein the tripping means comprises a spring-biased cam coupled to the second lever arm, movement of the spring-biased cam causing the first lever arm to move the movable contact relative to the stationary contact.

6. The circuit breaker of claim 5, wherein the low oil trip means comprises a lever that releases the spring-biased cam to cause the circuit to open.

7. The circuit breaker of claim 6, wherein the fault interrupting means actuates an actuator to release the spring-biased cam to cause the circuit to open.

8. A circuit breaker for a transformer, comprising:

a stationary contact configured to be electrically coupled to a circuit of a transformer;

a movable contact;

a tripping apparatus that moves the movable contact relative to the stationary contact to open and close the circuit, wherein the tripping apparatus comprises a first lever arm coupled to the movable contact and a second lever arm coupled to a rod, wherein the rod is detachably coupled to the first lever arm such that when the rod is detached from the first lever arm, the first lever arm descends moving the movable contact;

a fault interrupting apparatus that causes the tripping apparatus to open the circuit upon a fault condition in the transformer; and a low oil trip apparatus that causes the tripping apparatus to open the circuit when a level of dielectric fluid in a tank of the transformer is below a threshold level, wherein the low oil trip apparatus operates independently of the fault interrupting apparatus to open the circuit without actuating any components of the fault interrupting apparatus.

9. The circuit breaker of claim 8, wherein the fault interrupting apparatus comprises:

a magnet; and a curie metal element electrically coupled to the circuit and configured to release a magnetic coupling between the magnet and the curie metal element upon the fault condition, wherein the low oil trip apparatus causes the circuit to open without releasing the magnetic coupling between the magnet and the curie metal element.

10. The circuit breaker of claim 9, wherein the fault interrupting apparatus further comprises an actuator coupled to the magnet and configured to move in conjunction with the magnet, wherein release of the magnetic coupling between the magnet and the curie metal element moves the actuator to cause the tripping apparatus to open the circuit.

11. The circuit breaker of claim 8, wherein the low oil trip apparatus comprises:

a float member configured to float in the dielectric fluid;

a low oil rod coupled to the float member; and wherein the float member is configured to apply a force to the low oil rod to actuate the second lever arm when the level of dielectric fluid in the tank recedes below the threshold level, actuation of the second lever arm causing the tripping apparatus to open the circuit.

12. The circuit breaker of claim 8, wherein the tripping apparatus comprises a spring-biased cam coupled to the second lever arm , movement of the spring-biased cam causing the first lever arm to move the movable contact relative to the stationary contact.

13. The circuit breaker of claim 12, wherein the low oil trip apparatus comprises a lever that releases the spring-biased cam to cause the circuit to open.

14. The circuit breaker of claim 13, wherein the fault interrupting apparatus actuates an actuator to release the spring-biased cam to cause the circuit to open.

15. A circuit breaker assembly for a transformer, comprising:

a plurality of circuit breakers, each circuit breaker comprising:

a tripping apparatus that moves a movable contact relative to a stationary contact to open and close a circuit, wherein the tripping apparatus comprises a first lever arm coupled to the movable contact and a second lever arm coupled to a rod, wherein the rod is detachably coupled to the first lever arm such that when the rod is detached from the first lever arm, the first lever arm descends moving the movable contact;

a fault interrupting means for causing the tripping apparatus to move the movable contact to open upon a fault condition in the transformer, and low oil trip means for causing the tripping apparatus to move the movable contact to open when a level of dielectric fluid in a tank of the transformer is below a threshold level, wherein the low oil trip means operates independently of the fault interrupting means to open the circuit without actuating any components of the fault interrupting means; and a linkage bar coupled to each of the circuit breakers, the linkage bar rotating in response to the fault interrupting means of one of the circuit breakers causing the circuit associated with the one of the circuit breakers to open, the rotating of the linkage bar causing the fault interrupting means of each other circuit breaker to open the circuit associated with the other circuit breaker.

16. The circuit breaker assembly of claim 15, wherein the circuit breaker assembly comprises three circuit breakers, each circuit breaker being associated with a different phase of three phase power in the transformer.

17. The circuit breaker assembly of claim 15, wherein the fault interrupting means of each circuit breaker comprises:

a magnet; and a curie metal element electrically coupled to the circuit associated with the circuit breaker and configured to release a magnetic coupling between the magnet and the curie metal element to open the circuit associated with the circuit breaker upon the fault condition, wherein the low oil trip means causes the circuit associated with the circuit breaker to open without releasing the magnetic coupling between the magnet and the curie metal element.

18. A method for protecting a circuit of a transformer, comprising the steps of:

determining whether a fault condition exists in a transformer;

in response to determining that a fault condition exists in the transformer, releasing a magnetic coupling to cause a tripping apparatus to open the circuit in the transformer;

determining whether a level of dielectric fluid in a tank of the transformer is below a threshold level; and in response to determining that the level of dielectric fluid is below the threshold level, causing the tripping apparatus to open the circuit in the transformer without releasing the magnetic coupling, wherein the tripping apparatus moves a movable contact relative to a stationary contact to open and close the circuit, wherein the tripping apparatus comprises a first lever arm coupled to the movable contact and a second lever arm coupled to a rod, wherein the rod is detachably coupled to the first lever arm such that when the rod is detached from the first lever arm, the first lever arm descends moving the movable contact.

* * * * *